May 7, 1940.                R. E. KEYES                 2,199,632
                             AIR WASHER
                        Filed April 8, 1938         4 Sheets-Sheet 1
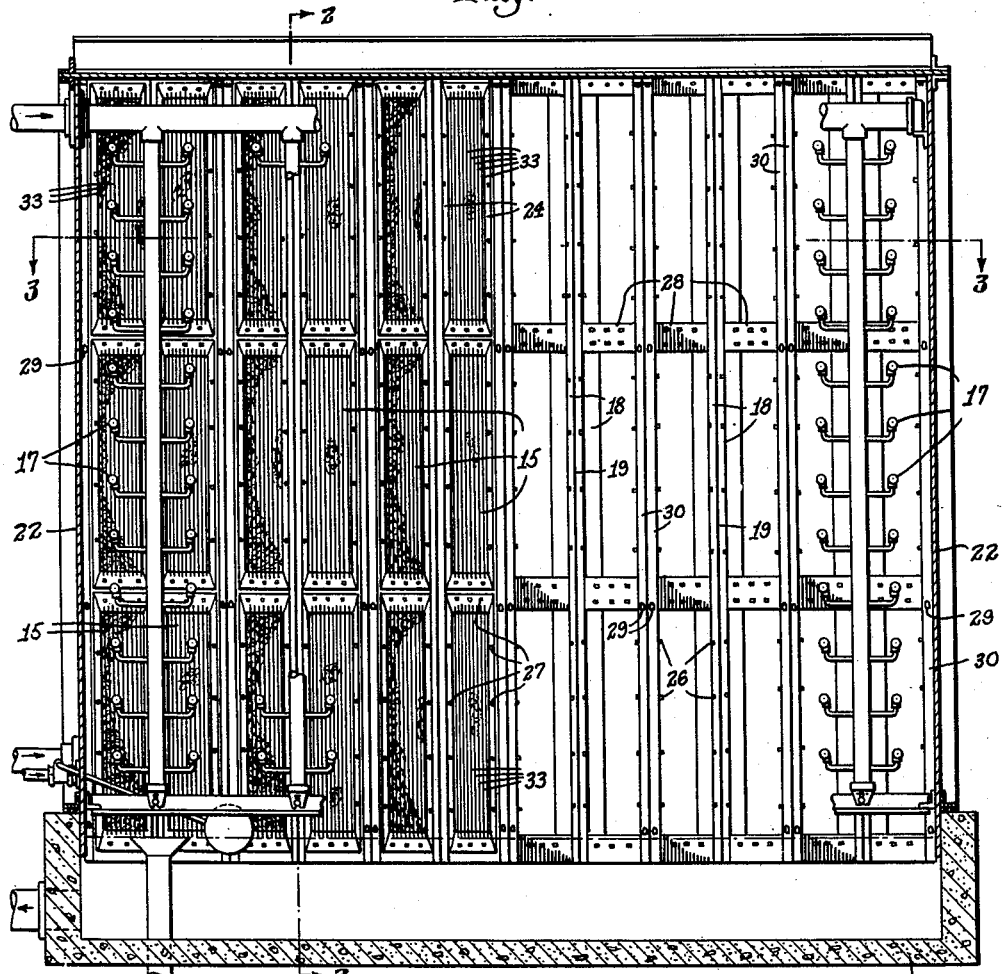
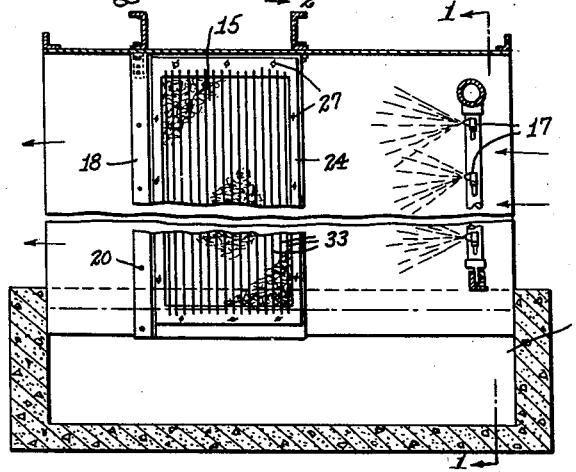
Inventor
ROBERT E. KEYES
by Robert J. Palmer
Attorney May 7, 1940.  R. E. KEYES  2,199,632
AIR WASHER
Filed April 8, 1938  4 Sheets-Sheet 2

Inventor
ROBERT E. KEYES
by Robert T. Palmer
Attorney

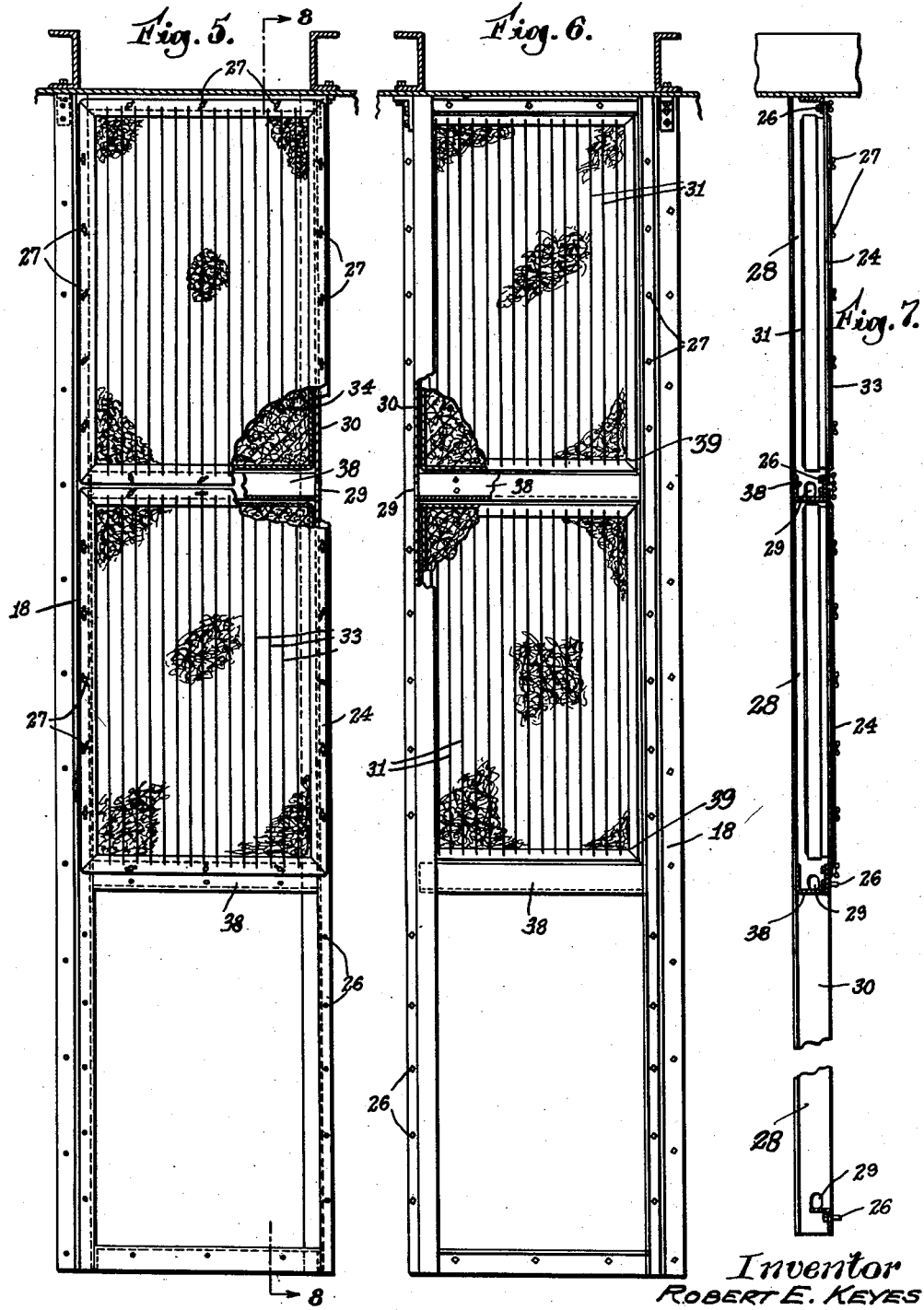

May 7, 1940.  R. E. KEYES  2,199,632
AIR WASHER
Filed April 8, 1938  4 Sheets-Sheet 4
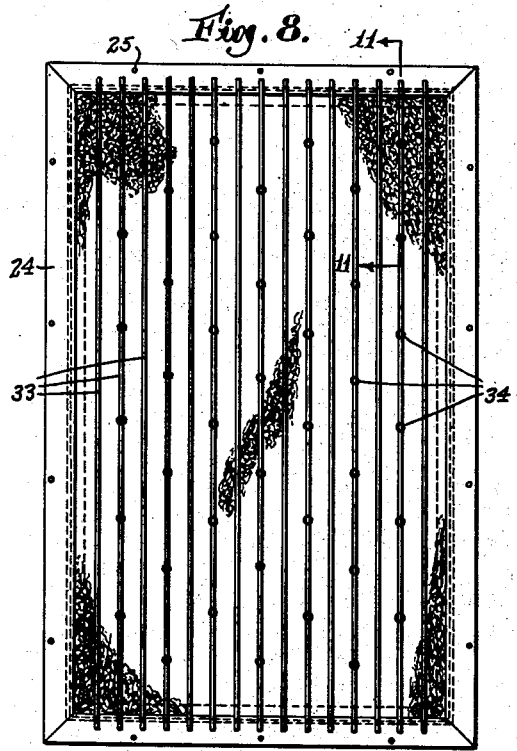
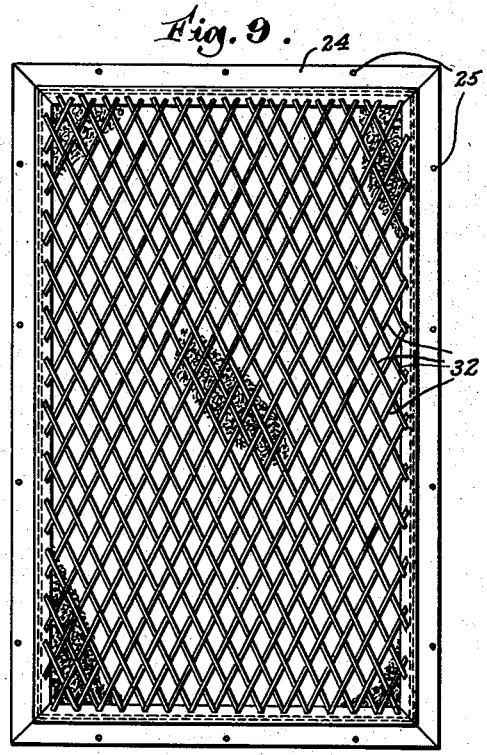
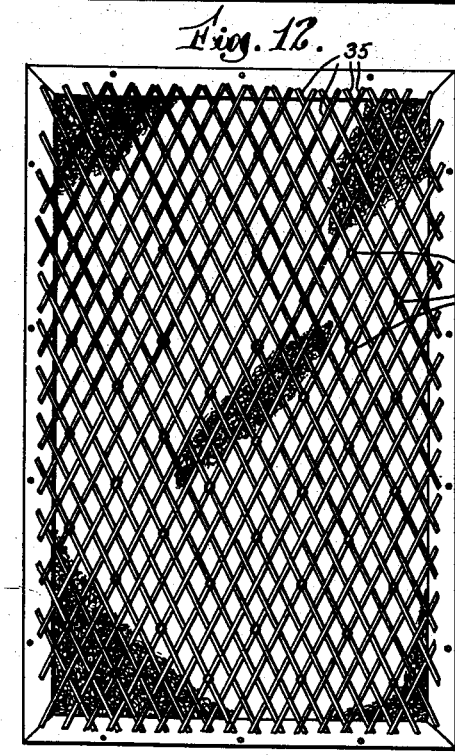
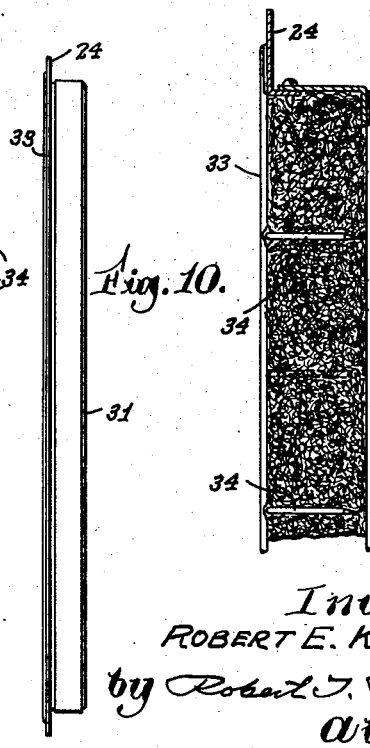
Inventor
ROBERT E. KEYES
by Robert J. Palmer
Attorney Patented May 7, 1940

2,199,632

UNITED STATES PATENT OFFICE 2,199,632

AIR WASHER

Robert E. Keyes, Wellesley Hills, Mass., assignor to B. F. Sturtevant Company, Boston, Mass.

Application April 8, 1938, Serial No. 200,920

3 Claims. (Cl. 183—16)

This invention relates to air washers and relates more particularly to air washers for air conditioning systems.

The usual air washer includes not only one and usually several banks of sprays, but air filters for removing impurities from the air, and eliminators for removing entrained moisture. Furthermore, it is made relatively large for providing considerable air washing space since it depends upon the water sprays for saturating the air, and as a result requires the spraying of a large volume of water.

This invention provides a very efficient, compact air washer, utilizing less equipment for conditioning the air and requiring but a relatively small volume of water, and offering but relatively small air resistance.

An object of the invention is to provide an efficient, compact air washer.

Another object of the invention is to wash air with but a relatively small amount of water.

Another object of the invention is to provide a combined filter and eliminator.

Another object of the invention is to provide a combined filter, air washer and eliminator.

Other objects of the invention will be apparent from the following description taken with the drawings.

The invention will now be described with reference to the drawings, of which:

Fig. 1 is an enlarged end view, in section of one embodiment of an air washer according to this invention and is taken along the lines 1—1 of Fig. 2;

Fig. 2 is a sectional view along the lines 2—2 of the air washer of Fig. 1;

Fig. 5 is a front view along the lines 5—5 of Fig. 4;

Fig. 6 is a rear view along the lines 6—6 of Fig. 4;

Fig. 7 is a cross-sectional view along the line 7—7 of the filter assembly of Fig. 6, Fig. 6 being a rear view;

Fig. 8 is an enlarged front view of one of the filters of Fig. 5;

Fig. 9 is an enlarged rear view of another embodiment of a filter which may be used to replace that shown in Figs. 5, 6 and 8.

Fig. 10 is an end view of the filter of Fig. 8;

Fig. 11 is a partial sectional view of the filter of Fig. 8;

Fig. 12 is an enlarged front view of the filter of Fig. 9;

Figure 3:
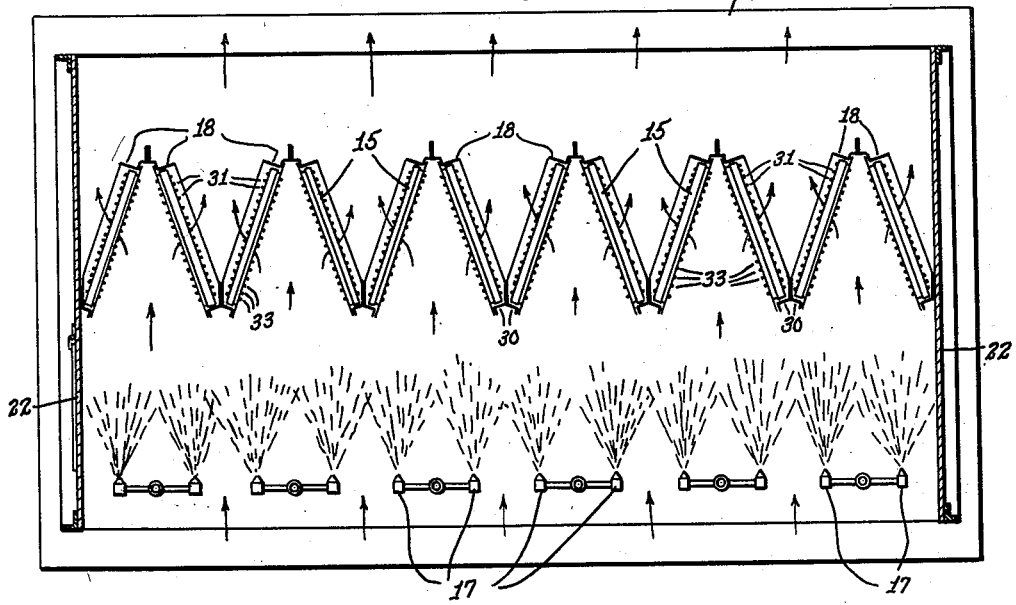
Fig. 3 is a sectional view along the lines 3—3 of Fig. 1.

As shown most clearly by Fig. 3, a plurality of filters 15 are arranged in a zigzag path transverse the air washer 16. Their rear-most portions terminate adjacent the leaving air or outlet end of the washer and their front portions are arranged substantially in the center of the washer. The spray nozzles 17 are arranged adjacent the inlet end of the washer and project water sprays in the direction of air flow upon the filters 15. Although Fig. 3 shows the sprays from the nozzles 17 terminating short of the filters, the spray is actually projected upon the entire filter surface.

The filters 15 may contain glass wool or other satisfactory filter material which is completely wetted by the water spray. The filter material is thus covered with water and the air forced through the filters is cleaned by the filter material and by the water on the filter material. The air is cleaned and conditioned by the water in the spray between the nozzles 17 and the filters 15 and by the water on the filters 15.

The wetted filters so condition and cleanse the air due to the large water to air surface provided that but a small fraction of the water projected in the usual washer, is required for providing a given conditioning and cleansing effect.

The filters 15 are arranged in a zig-zag path so as to provide the maximum air contact with minimum air resistance.

As shown most clearly by Figs. 1, 5, 6, and 7, the filters 15 are arranged in three superimposed rows. This is desirable for the particular washer under discussion but other arrangements are comprehended.

A feature of the invention resides in arranging the filters at the outlet side of the washer and of providing means for preventing water droplets from being entrained by the air leaving the filters so that the usual eliminator plates may be dispensed with. The filter containing frames 28 are so constructed that they are air tight so that the air flow can only take place through the filters 15 and cannot take place between them. This not only increases the effectiveness of the filters but prevents spray particles from passing between the filters to be entrained by the air leaving the washer.

Figure 4:
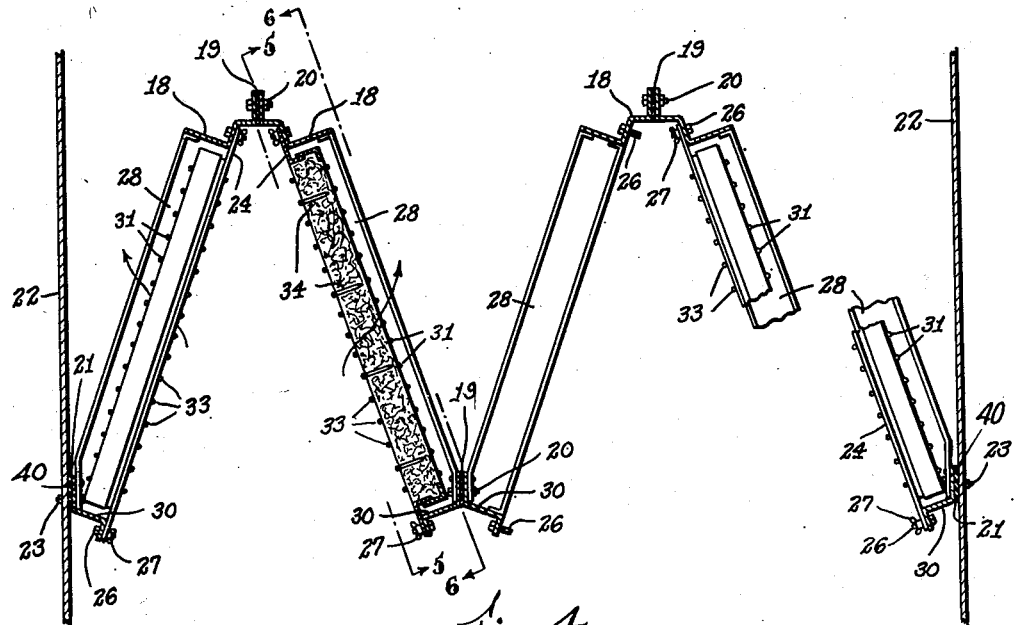
Fig. 4 is an enlarged plan view, in section, of a portion of the filter assembly of Fig. 3 and illustrates the mounting details.

As shown by Fig. 4, rubber gaskets 19 are placed between the end walls 18 and 30 of the frames 28 at their contacting portions which are then bolted together by the bolts 20. The rubber gaskets 21 are placed between the longitudinal sides 22 of the washer and the angular portions 40 of the outermost frames 28 and they are bolted together by the bolts 23. The individual filter frames are thus so joined to each other and to the longitudinal sides of the washer that no air nor water can pass at the points of joindure.

Each filter 15 is provided with an outwardly extending flange portion 24 (Fig. 8) which contains on all four sides, the circular openings 25. These openings 25 receive the bolts 26 which as shown by Figs. 4, 5 and 7 hold the filters in their frames 28. The wing nuts 27 which are screwed upon the bolts 26 to hold the filters in place, provide that the filters may be quickly and easily removed without tools, by the hands.

A difficulty resulting from the use of wetted filters is that of preventing the water which drains by gravity to the base of the filters from overflowing into the air stream at the back on leaving the air side of the filters and from producing spray particles as by impact against a lower placed element, which spray particles are entrained by the air leaving the washer.

Another feature of this invention resides in providing a sump below each filter for collecting the water draining by gravity from the filters and in providing each sump with an opening at the front end of its associated filter so that all of the water draining from the filter flows down the front or entering air side of the apparatus into the base of the air washer. With this arrangement, no water draining from the filters can flow into the air leaving them, to produce entrained moisture.

As shown by Fig. 7, in the frames 28 and below each of the two uppermost filters 15, the U-shaped members 38 form enclosed sumps in alignment with and below the filters, into which the water draining from the filters, by gravity, collects. The front vertical sides 30 (Figs. 3 to 7 inclusive) of the frames 28 are provided with the apertures 29 which serve to drain the water from the sumps formed by the U-shaped members 38, at the front or entering air side of the filters. Any of this water picked up by the air stream is carried against the filters and is collected by them. The closed end walls 18 of the frames prevent the water from leaving the sumps at the back sides of the filters.

Another difficulty resulting from the use of wetted filters is that there is a tendency for the air passing through the filters to take with it, water droplets from the filter surface.

Another feature of this invention resides in providing a plurality of relatively closely spaced wires extending vertically or at an angle from the top to the bottom of each filter, in contact with and protruding to the rear from the back or leaving air side thereof. These wires extend below the lines 39 of Fig. 6 which indicate the boundary of the exposed portions of the filters and terminate at their lower ends in or adjacent the sumps at the base of the filters, and the water droplets tending to move cross-wise the back sides of the filters under the influence of the air stream and tending under the influence of gravity to move down the back side of the filters collect upon these wires and flow down them into the drainage sumps. The drops of water adhere first through capillary action to the back sides of the filters, are then carried by the air pressure to the wires to which they adhere and drain down the wires and are not therefore carried away into the air stream.

In the embodiment illustrated by Figs. 5, 6 and 8, the wires 31 which collect any droplets at the back side of the filters are arranged substantially vertically. They extend from the top to the bottom of the filters and are spaced closely together crosswise the filters.

In the embodiment illustrated by Figs. 9 and 12, the wires 32 at the back side of the filters are inter-woven in a criss-cross fashion to form a wire mesh with individual wires all slanting downwardly. With this arrangement, the drops adhering to one wire may transfer themselves to other wires or to the frames at points where they meet or cross.

Another difficulty of utilizing wetted filters is that the weight of the water causes the filter material to settle and leave open spaces at the tops of the filters, through which open spaces, the air and entrained moisture may pass.

Another feature of this invention, resides in providing external mechanical support, at a plurality of points, for the filter material. In one embodiment, as illustrated by Fig. 8, the plurality of vertically arranged wires are provided along the front sides of the filters. The plurality of pins, or spikes 34 extend into the filter material as shown by Fig. 11 and are attached to the wires 33 as by brazing. In the embodiment illustrated by Fig. 12, the wire mesh 35 may extend across and along the front side of each filter and the pins or spikes are attached to the wires in this mesh at their cross-over points. The pins or spikes 34 prevent the filter material from settling by holding it mechanically in place at a plurality of supporting points.

It is not necessary, of course, to use wire mesh at the back side of the filters when it is used at the front, nor is it necessary to use vertical wires at the back when they are used at the front. The wires at the front and back have different functions and it is a matter of choice as to what form of supports should be used at the front of the filters for aiding in supporting the filter material, and what form of wires should be used at the backs of the filters for providing drainage.

While several embodiments of the inventions have been described for the purpose of illustration, it should be understood that the inventions are not limited to the exact apparatus and arrangement of apparatus illustrated, as many departures may be suggested by those skilled in the art without departing from the spirit of the invention.

What is claimed is:

1. In an air washer, a plurality of superimposed rows of filters arranged cross-wise said washer in a zig-zag path and exposed on their front sides of the spray water, means forming sumps below each of said rows of filters and in alignment with said filters for collecting the water draining by gravity from said filters, and means comprising wires protruding from the back sides of said filters and extending below the exposed portions of the filter material to points adjacent said sumps for collecting water droplets at the back sides of said filters and for draining the droplets into said sumps.

2. In an air washer, a plurality of superimposed rows of filters arranged cross-wise said washer in a zig-zag path and exposed on their front sides to the spray water, means forming sumps below each of said rows of filters and in alignment with said filters for collecting the water draining by gravity from said filters, means protruding from the back sides of said filters and extending below the exposed portions of the filter material to points adjacent said sumps for collecting water droplets at the back sides of said filters and for draining the droplets into said sumps, and means in the front edges of said sumps at the apices formed by the front edges of adjacent filters for draining the water from said sumps into said washer at the front sides of said filters, said sumps including means for preventing the water therein from draining therefrom at the back sides of said filters.

3. In an air washer, two superimposed rows of filters arranged cross-wise said washer in a zigzag path and exposed on their front sides to the spray water, means forming a sump below the upper of said rows of filters and in alignment with said filters for collecting the water draining by gravity from the upper filters, means forming relatively small openings in the front edge of said sump at the apices formed by the front edges of adjacent upper filters for draining the water from said sump into said washer, said sump including means for preventing the water collected thereon from draining therefrom except through said openings, and means protruding from the back sides of said filters and extending below the exposed portions of the filter material to points adjacent and in alignment with said sump for collecting water droplets at the back sides of said upper filters and for draining said droplets into said sump.

ROBERT E. KEYES.